(12) United States Patent
Liburdi

(10) Patent No.: US 7,380,044 B1
(45) Date of Patent: May 27, 2008

(54) IEEE 1394 TO COAXIAL CABLE ADAPTER

(76) Inventor: Francesco Liburdi, 2653 Alexander St., Endicott, NY (US) 13760

( * ) Notice: Subject to any disclaimer, the term of this patent is extended or adjusted under 35 U.S.C. 154(b) by 194 days.

(21) Appl. No.: 11/405,074

(22) Filed: Apr. 17, 2006

(51) Int. Cl.
*G06F 13/20* (2006.01)
*G06F 13/12* (2006.01)

(52) U.S. Cl. ........................................ 710/313; 710/62

(58) Field of Classification Search ........ 710/305–313, 710/62–64
See application file for complete search history.

(56) References Cited

U.S. PATENT DOCUMENTS

| | | | | |
|---|---|---|---|---|
| 5,299,314 | A * | 3/1994 | Gates | 710/64 |
| 5,579,486 | A * | 11/1996 | Oprescu et al. | 710/107 |
| 6,502,997 | B1 * | 1/2003 | Lee et al. | 385/88 |
| 7,290,148 | B2 * | 10/2007 | Tozawa et al. | 713/189 |
| 2002/0194383 | A1 * | 12/2002 | Cohen et al. | 709/249 |
| 2002/0194605 | A1 * | 12/2002 | Cohen et al. | 725/78 |
| 2003/0159062 | A1 * | 8/2003 | Tozawa et al. | 713/200 |
| 2005/0204066 | A9 * | 9/2005 | Cohen et al. | 709/249 |
| 2006/0095597 | A1 * | 5/2006 | Bai et al. | 710/8 |
| 2007/0083769 | A1 * | 4/2007 | Iwamura | 713/189 |
| 2007/0133404 | A1 * | 6/2007 | Gaedeken et al. | 370/229 |

* cited by examiner

*Primary Examiner*—Christopher Shin
(74) *Attorney, Agent, or Firm*—Mark Levy; Hinman, Howard & Kattell

(57) ABSTRACT

An apparatus for allowing IEEE-1394-enabled devices to communicate with one another across an existing coaxial cable network in, for example, a house. Many houses have been "wired for cable" and have such a cable network in place. The network is, in its native state, unsuitable for IEEE-1394 communication. The apparatus allows processing signals from an IEEE-1394-enabled device for transmission across a coax. Signals received are converted and then provided to IEEE-1394 devices connected to the apparatus. One use for the apparatus is interconnecting audio/visual devices, for example high definition television receivers, DVD players, audio components and the like located in throughout a house to one another. DTCP encryption and decryption may be provided. The apparatus may be equipped with an optional SMI connector to allow communication over an optical fiber in lieu of the coaxial network. The apparatus is self-powered, deriving necessary power from the IEEE-1394 interface itself.

9 Claims, 4 Drawing Sheets

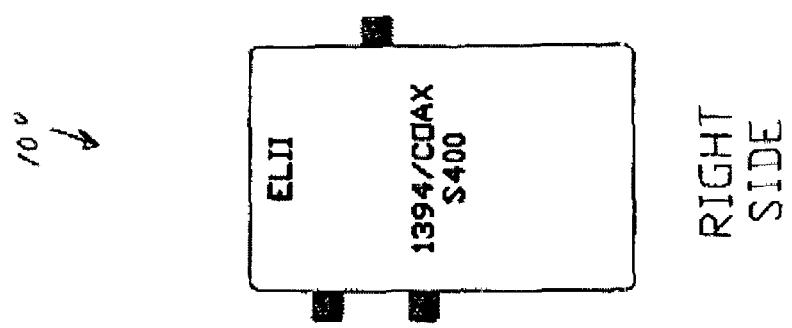
Fig. 2b RIGHT SIDE
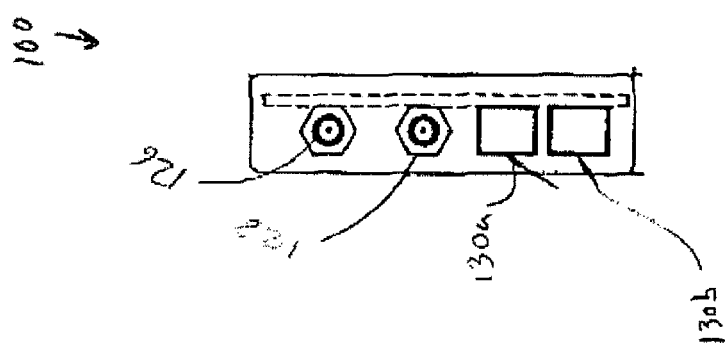
Fig. 2a
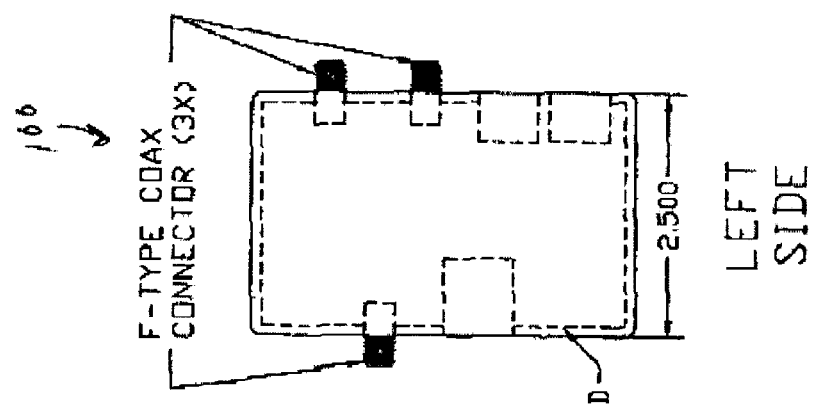
Fig. 2c LEFT SIDE
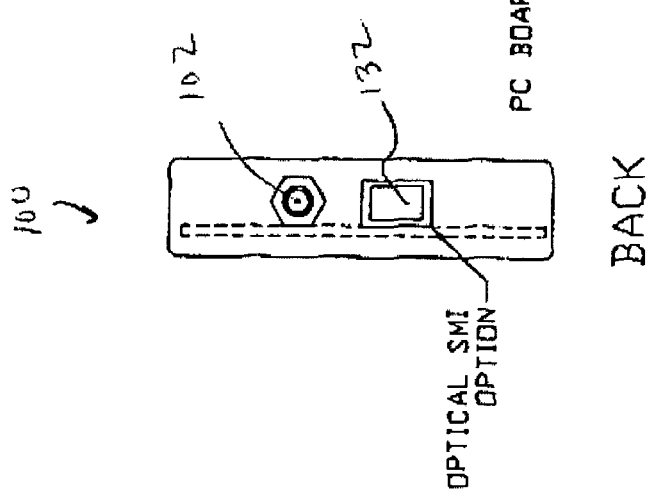
Fig. 2d BACK

US 7,380,044 B1

IEEE 1394 TO COAXIAL CABLE ADAPTER

FIELD OF THE INVENTION

The present invention pertains to coaxial cable adapters and, more particularly, to an apparatus for allowing bi-directional communication between two IEEE-1394-enabled devices connected to one another by a coaxial cable.

BACKGROUND OF THE INVENTION

The IEEE-1394 standard defines a serial communication protocol also known as "Firewire". Over high quality optical fiber, IEEE-1394 allows devices to be separated up to 100 meters. Of course, with lower quality communications links, this distance is reduced. When introduced in the 1980s, the communication speed was approximately 100 megabits/second. Later versions defined in the IEEE-1394a and IEEE-1394b standards provide data rates of 200 and 400 megabits/second, respectively.

The use of IEEE-1394 interfaces for communication between electronic devices is already widespread and growing in popularity. This is particularly true in the home entertainment field where high definition television (HDTV) is rapidly gaining in popularity. To take full advantage of the high-quality picture of a modern HDTV, the set must be provided with a clean input signal. Optimum performance is obtained when a digital signal is provided directly to a digital video interface (DVI) or high definition multimedia interface (HDMI) of the television receiver. A DVI/HDMI interface allows transfer of uncompressed digital video signals, typically with high-bandwidth digital content protection (HDCP) copy protection. An IEEE-1394 interface also allows transferring and inputting high quality digital video, and/or audio signals to devices equipped therewith.

As home theater has grown in popularity, a need to transfer high quality audio and/or video signals between different areas of a structure has emerged. Since high communication bandwidths are required to maintain, for example, HDTV video signal quality, creating such interconnections has heretofore been both technically challenging and expensive. However, for many years structures have been "wired for cable" (i.e., have networks of coaxial cable in place). Most in-place coaxial cable, however, is not suitable for networking multiple audio-video (AV) devices such as HDTV receivers, high quality DVD players, etc.

SUMMARY OF THE INVENTION

In accordance with the present invention, there is provided an apparatus that utilizes existing coaxial cable networks in place throughout a structure (e.g., a house) to network several IEEE-1394-enabled devices while maintaining desirable video and audio signal quality. The apparatus creates a digital home connectivity solution that allows simultaneous streaming of multiple HDTV programs, high quality multi-channel audio, and high-speed data throughout the home. The novel apparatus also allows ultra wide band (UWB), real-time, visually lossless HDTV as well as the ability to provide an interactive connection between HD video game consoles and HD displays. The apparatus allows for seamless interconnection of, for example, a large screen flat panel display in a living room to all the other multimedia devices in the home. Such devices might include, for example, a DVD player in the bedroom, a video camera in the family room, etc. In another example, the novel apparatus enables the transfer of visual images from an IEEE-1394-enabled notebook computer sent to the flat panel display in another room for viewing.

A transceiver is used to connect to an existing cable network infrastructure in a house or other structure. The transceiver is connected to an IEEE 1394 linking device, for example, a TI iceLynx-Micro (consumer electronics link with integrated micro controller and physical layer (PHY)). Such a device provides a high performance 1394 link-layer device designed as a total solution for digitally interfacing advanced audio/video consumer electronics applications.

The inventive apparatus is equipped with an I/O port for interconnection to an existing coax cable network, typically using an industry standard "F" connector. The interconnection of multiple IEEE-1394-enabled devices to one another is accomplished by using one of the inventive apparatus proximate each device or cluster of devices. In the preferred embodiment, each interface apparatus supports up to 12 IEEE-1394-enabled devices.

It is, therefore, an object of the invention to provide an interface adapter allowing IEEE-1394-enabled devices to communicate with one another across a coax cable network.

It is a further object of the invention to provide an interface adapter allowing IEEE-1394-enabled devices to communicate with one another using existing TV coaxial cable wiring in a building.

It is another object of the invention to provide an interface adapter allowing IEEE-1394-enabled devices to communicate with one another and wherein multiple IEEE-1394-enables devices may be connected to a single interface adapter.

It is yet another object of the invention to provide an interface adapter allowing IEEE-1394-enabled devices to communicate with one another that is self-powered.

It is a still further object of the invention to provide an interface adapter allowing IEEE-1394-enabled devices to communicate with one another that has an option optical SMI connector for communicating over an optical fiber.

It is an additional object of the invention to provide an interface adapter allowing IEEE-1394-enabled devices to communicate with one another wherein DTCP encryption and decryption is maintained on video signals being processed.

It is a further object of the invention to provide an interface adapter allowing IEEE-1394-enabled audio/video devices to communicate with one another.

BRIEF DESCRIPTION OF THE DRAWINGS

A complete understanding of the present invention may be obtained by reference to the accompanying drawings, when considered in conjunction with the subsequent detailed description, in which:

FIGS. 2a-2d are front, right, left, and rear schematic views, respectively, of an implementation of the IEEE-1394 to coax adapter of FIG. 1.

DETAILED DESCRIPTION OF THE PREFERRED EMBODIMENT

The present invention provides a simple, self-contained interface adapter apparatus that allows networking a number of IEEE-1394-enabled devices using existing wiring, typically coaxial cables to provide network interconnections.

Figure 1:
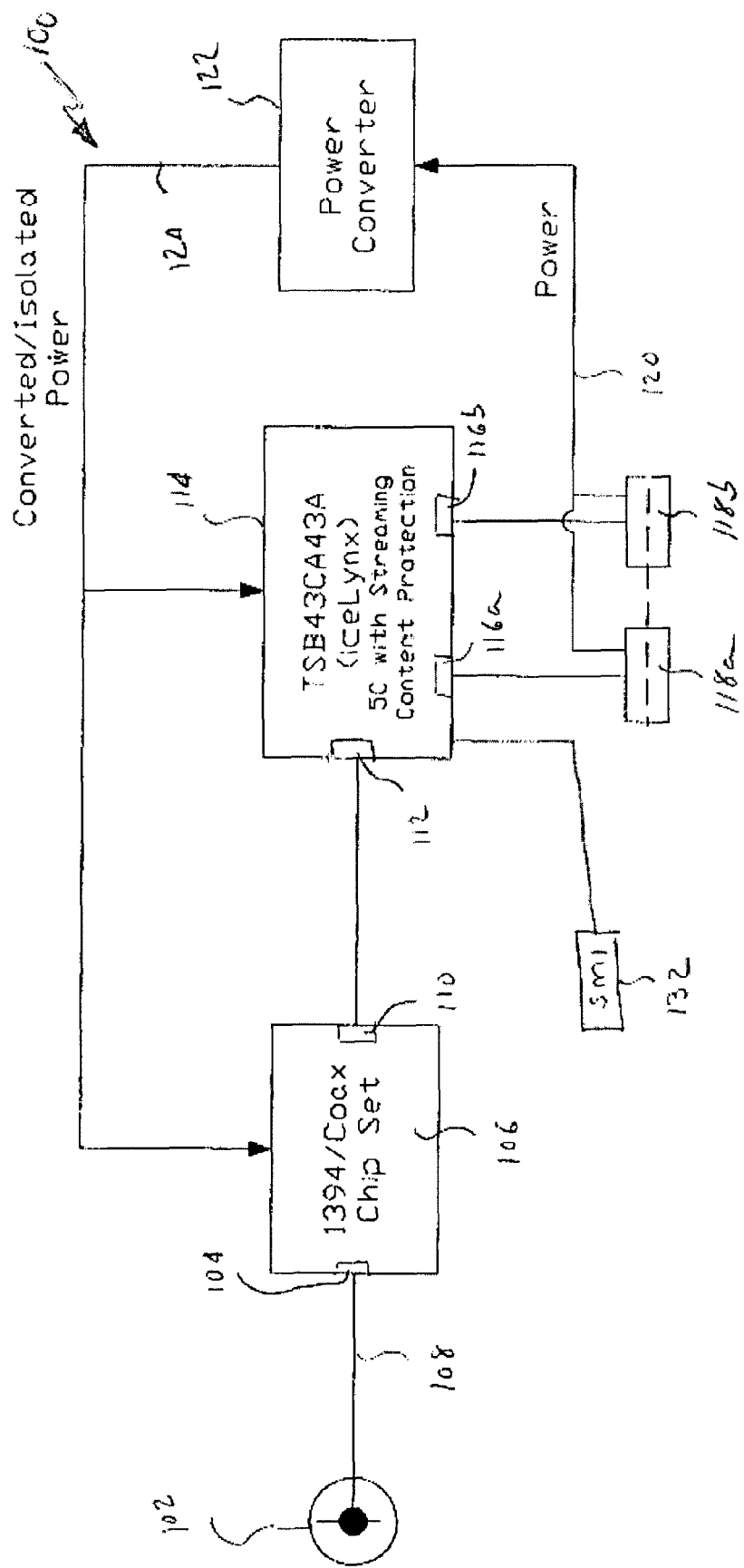
FIG. 1 is a schematic block diagram of the IEEE-1394 to coax adapter of the invention.

Referring first to FIG. 1, there is shown a functional block diagram of the inventive interface device, generally at reference number 100. A coaxial connector 102 is connected to a first I/O port 104 of a transceiver 106 via a coaxial connection 108. A second I/O port 110 of transceiver 106 is connected to an I/O port 112 of an IEEE-1394 linking device 114. Linking device 114 has at least two IEEE-1394 ports 116a, 116b, operably connected respectively to IEEE-1394 ports 118a, 118b.

Also connected to ports 118a, 118b is a power connection 120. Power connection 120 is connected to a power converter 122. Converted and isolated power 124 from power converter 122 is connected to transceiver 106 and linking device 114. While power derived from IEEE-1394-enabled devices, not shown, connected to one of IEEE-1394 ports 118a, 118b via connectors 130a, 130b (FIG. 2a) is shown as the power source for interface device 100, it will be recognized that power may optionally be supplied from an external power source, not shown.

An SMI connector 132 is provided to optionally connecting adapter 100 to an optical fiber network, replacing the coaxial connection normally provided through connector 102. It will be recognized by those of skill in the art that while connector 136 is shown directly connected linking device 114, intermediary signal processing or conversion circuitry, not shown, may be required. Such signal processing or conversion circuitry is well known to those of skill in the art and is not described in further detail herein.

Transceiver 104 may be implemented using chips manufactured by Pulse-Link Incorporated of Carlsbad, Calif. Specifically, chip catalog numbers PL3110, PL3120, and PL3130 have been found suitable for the application.

Linking device 114 may be implemented using a using an iceLynx-Micro (consumer electronics link with integrated micro controller and physical layer (PHY)) manufactured by Texas Instruments (TI). For purposes of disclosure, linking device 114 is a model TSB43CA43A device that incorporates digital transport copy protection (DTCP) encryption and decryption. It will be recognized by those of skill in the art that other models of the TI device or other devices provided by other manufacturers may be substituted therefor. Consequently, the invention is not limited to the particular device chosen for purposes of disclosure.

Linking device 114 is a high performance 1394 link-layer device designed for digitally interfacing advanced audio/video consumer electronics applications. In addition to supporting transmit and receive of MPEG2 and DSS formatted transport streams with encryption and decryption, the LINKING DEVICE 114 device supports the both the IEC 61883-6 and audio music protocol standards for audio format as well as providing packetizing and asynchronous and asynchronous data streams as defined by the IEEE 1394 standard.

The LINKING DEVICE 114 device includes an embedded ARM7TDMI microprocessor core with access to 256K bytes of internal program memory. The ARM7 is embedded to process IEEE-1394 specific transactions, thereby significantly reducing the processing required by a host CPU or other IEEE-1394-enabled device. The ARM7 is accessed from the 16/1-bit host CPU interface, from a UART communication port, or from a JTAG debug port.

The LINKING DEVICE 114 device includes an integrated 3-port PHY that allows enhanced flexibility as two additional devices can be utilized in a system application. The PHY's speeds are capable of running at 100 Mbps, 200 Mbps, or 400 Mbps while meeting al requirements of the IEEE 1394-1995 and IEEE 1394a-2000 standards. The LINKING DEVICE 114 incorporates two M6 baseline ciphers (one per HSDI port) to support transmitting and receiving MPEG2 formatted transport streams with encryption and decryption. The device supports the IEC 61883-6 and audio music protocol standards for audio format and packetizing. Two configurable high speed data interfaces support the following audio and video modes: MPEG2-DVB interface, MPEG2-DSS interface, DV codec interface, IEC60958 interface, and Audio DAC interface, SACD interface.

Referring now to FIGS. 2a-2d, there are shown front, right, left, and rear schematic elevational views, respectfully, of one embodiment of interface device 100 (FIG. 1).

In FIG. 2a, two coaxial connectors 126, 128 are provided. Connectors 126, 128 may, using conventional splitter components and circuitry, both of which are known to those of skill in the art, provide a traditional splitter function. This allows interface unit 100 to replace a conventional two-way splitter, not shown, in installations where such a splitter is in place prior to installation of interface box 100.

Two six position connectors 130a, 130b allow connection of up to 12 IEEE-1394-enabled devices, not shown, thereto using appropriate cables, not shown. Such connectors and cables are known to those of skill in the art and are not further described herein.

In FIG. 2d, there may be seen coax connector 102 used to connect the inventive apparatus to a coax network.

Connector 102 is typically an "F" connector well known to those of skill in the art.

An SMI optical connector 132 is also disposed on the rear surface of the case housing the inventive apparatus. When an optical fiber interconnection is available, SMI connector 132 allow connecting adapter unit 100 to the optical fiber, replacing a coax connection to connector 102.

Figure 3A:
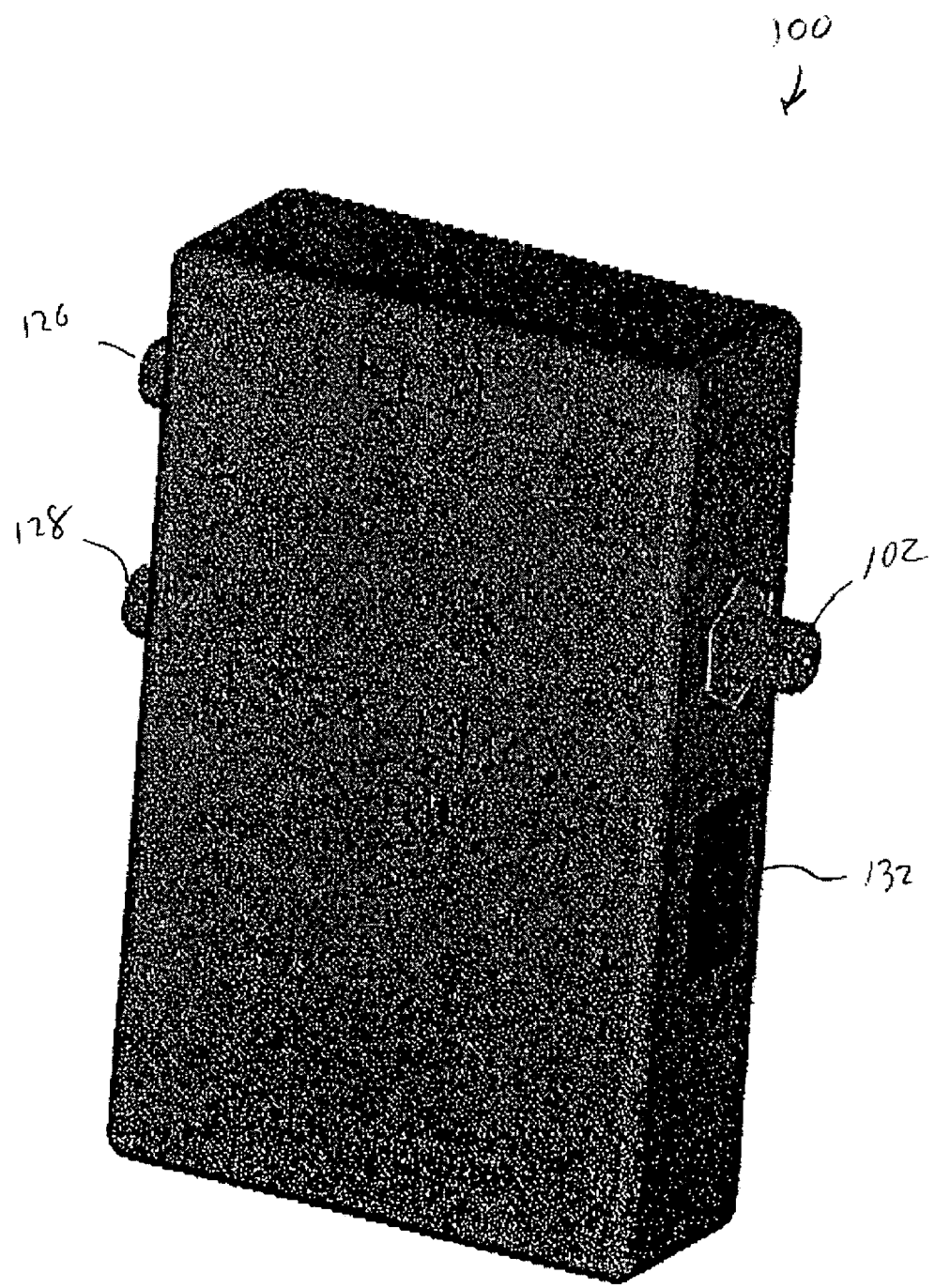
FIGS. 3a and 3b are right and left side perspective views, respectively, of the IEEE-1394 to coax adapter of FIG. 1.
Figure 3B:
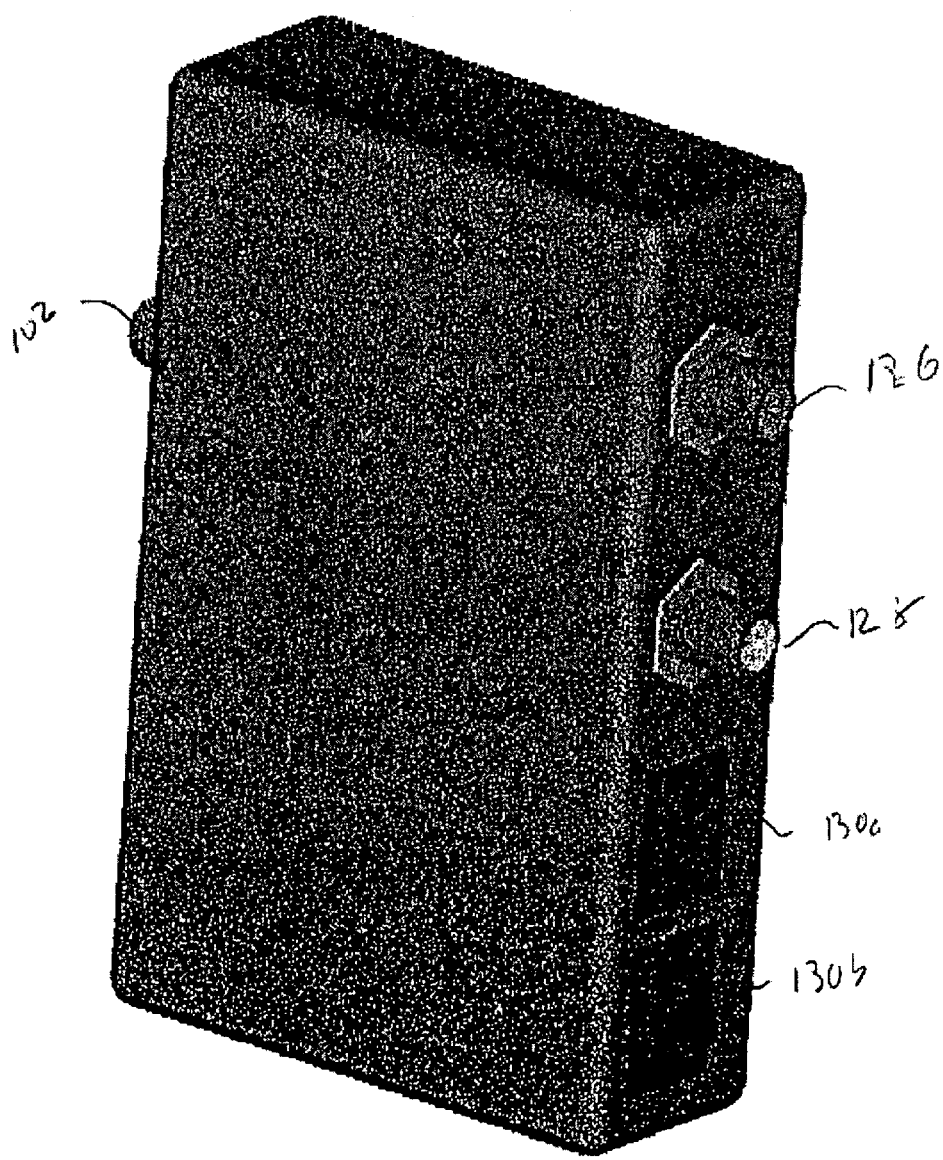

FIGS. 3a and 3b are perspective, pictorial views of the apparatus of FIGS. 2a-2d.

Referring again to FIGS. 2a-2d, in operation, a first inventive adapter unit 100 is connected to a coax network, not shown, via connector 102. A first IEEE-1394-enabled device, not shown, is connected to one of connectors 130a, 130b of the first adapter unit 100.

A second adapter unit 100 is also connected to the same coax network. A second IEEE-1394-enabled device, not shown, is connected to one of connectors 130a, 130b of the second adapter unit.

Up to twelve IEEE-1394-enabled devices may be connected to each adapter unit 100, six each to connectors 130a and 130b. It should be noted that the distance between adapter units 100 is typically limited, depending on the overall quality of the coaxial cable network and the data transmission speed.

When so arranged, the first IEEE-1394-enabled device may bi-directionally communicate with the second IEEE-1394-enabled device. In each adapter unit 100, data received from coax connector 102 is processed through transceiver 106 and passed to linking device 114. After proper formatting, coding or decoding and/or encryption/decryption, data is outputted via IEEE-1394 ports 118a, 118b through connectors 130a, 130b. The data is subsequently received by the connected IEEE-1394-enabled devices for use thereby.

Data originated at one of the IEEE-1394-enabled devices is provided to adapter unit 100 via connectors 130a, 130b and IEEE-1394 ports 118a, 118b is also processed by IEEE-1394 linking device 114. Subsequently, processed data is passed to transceiver 106, which, in turn, transmits the data to the coaxial cable network via connector 102.

Power for internal circuitry if adapter unit 100 is provided by the IEEE-1394-enables devices connected thereto so, typically, no additional power is required.

Since other modifications and changes varied to fit particular operating requirements and environments will be apparent to those skilled in the art, this invention is not considered limited to the example chosen for purposes of this disclosure, and covers all changes and modifications which does not constitute departures from the true spirit and scope of this invention.

Having thus described the invention, what is desired to be protected by Letters Patent is presented in the subsequently appended claims.

What is claimed is:

1. An apparatus to facilitate interconnections of IEEE-1394-enabled devices via existing coaxial wiring, comprising:
   a) a transmitter/receiver having a first input/output (I/O) port adapted for connection to a coaxial cable to allow bi-directionally communicating thereover and a set of I/O ports for interconnection to an IEEE-1394 linking device;
   b) an IEEE-1394 linking device operatively connected to said set of I/O ports and having at least two IEEE-1394 I/O ports adapted for interconnection to and communication with an IEEE-1394-enabled device operatively connected thereto; and
   c) an apparatus to facilitate interconnection of IEEE-1394-enabled devices, further comprising means for encrypting and decrypting a signal passing therethrough;
   whereby an IEEE-1394-enabled device connected to one of said set of IEEE-1394 I/O ports may communicate with another IEEE-1394-enabled device located remotely therefrom via a coaxial cable connected to said first I/O port.

2. The apparatus to facilitate interconnection of IEEE-1394-enabled devices as recited in claim 1, wherein said existing coaxial wiring comprises TV cable wiring.

3. The apparatus to facilitate interconnection of IEEE-1394-enabled devices as recited in claim 1, wherein said IEEE-1394-enabled device comprises at least two IEEE-1394-enabled devices.

4. The apparatus to facilitate interconnection of IEEE-1394-enabled devices as recited in claim 3, wherein said IEEE-1394-enabled device comprises at least six IEEE-1394-enabled devices.

5. The apparatus to facilitate interconnection of IEEE-1394-enabled devices as recited in claim 1, wherein said IEEE-1394-enabled device comprises an audio/video device.

6. The apparatus to facilitate interconnection of IEEE-1394-enabled devices as recited in claim 5, wherein said audio/video device comprises one from the group of: a high definition television receiver, a DVD player, an SACD player, and a computer.

7. The apparatus to facilitate interconnection of IEEE-1394-enabled devices as recited in claim 1, wherein said apparatus derives power for internal circuitry solely from an IEEE-1394-enabled device connected thereto.

8. The apparatus to facilitate interconnection of IEEE-1394-enabled devices as recited in claim 1, further comprising an SMI optical connector for interfacing to an optical fiber.

9. A method for allowing IEEE-1394 devices to communicate with one another across a coaxial cable network, the steps comprising:
   a) providing at least two IEEE-1394 to coaxial cable interface apparatus;
   b) connecting a first one of said at least two interface apparatus to a coaxial cable at a first point therealong;
   c) connecting a second one of said at least two interface apparatus to a coaxial cable at a second point therealong;
   d) connecting a first IEEE-1394-enabled device to an IEEE-1394 port of said first interface apparatus;
   e) connecting a second IEEE-1394-enabled device to an IEEE-1394 port of said second interface apparatus; and
   f) establishing communications between said first and said second IEEE-1394-enabled device over said coaxial cable.

\* \* \* \* \*